(12) United States Patent
Sodagar

(10) Patent No.: US 11,496,608 B2
(45) Date of Patent: Nov. 8, 2022

(54) TASK PROXIMITY FOR CLOUD SERVICES

(71) Applicant: TENCENT AMERICA LLC, Palo Alto, CA (US)

(72) Inventor: Iraj Sodagar, Los Angeles, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 0 days.

(21) Appl. No.: 17/354,740

(22) Filed: Jun. 22, 2021

(65) Prior Publication Data

US 2021/0320987 A1    Oct. 14, 2021

Related U.S. Application Data

(63) Continuation of application No. 17/213,948, filed on Mar. 26, 2021, now abandoned.

(60) Provisional application No. 63/087,735, filed on Oct. 5, 2020, provisional application No. 63/042,485, filed on Jun. 22, 2020, provisional application No. 63/042,477, filed on Jun. 22, 2020, provisional application No. 63/006,194, filed on Apr. 7, 2020.

(51) Int. Cl.
*G06F 15/16* (2006.01)
*H04L 67/63* (2022.01)
*H04L 67/10* (2022.01)

(52) U.S. Cl.
CPC .............. *H04L 67/63* (2022.05); *H04L 67/10* (2013.01)

(58) Field of Classification Search
CPC ..... H04L 67/327; H04L 67/10; H04L 63/102; H04L 63/20; G06F 9/5072
See application file for complete search history.

(56) References Cited

U.S. PATENT DOCUMENTS

| | | | |
|---|---|---|---|
| 9,632,838 B2* | 4/2017 | Ng | G06F 9/45558 |
| 2015/0066929 A1* | 3/2015 | Satzke | H04L 67/10 |
| | | | 706/12 |
| 2016/0148158 A1* | 5/2016 | Marth | G06Q 30/0243 |
| | | | 705/14.72 |
| 2017/0103360 A1* | 4/2017 | Ristock | H04L 67/18 |
| 2020/0110633 A1* | 4/2020 | Kolan | G06F 9/48 |
| 2020/0177694 A1* | 6/2020 | Kolan | H04L 65/605 |
| 2020/0304508 A1* | 9/2020 | Bae | H04L 63/0876 |

(Continued)

OTHER PUBLICATIONS

You et al.,"OMAF4CLOUD:Standards-Enabled360° Video Creation as a Service", 2019, https://Awww.ibc.org/download?ac=10503(13pages total) (Year: 2019).*

(Continued)

*Primary Examiner* — Cheikh T Ndiaye
(74) *Attorney, Agent, or Firm* — Sughrue Mion, PLLC

(57) ABSTRACT

Systems and methods for managing a Network Based Media Processing (NBMP) workflow are provided. A method includes obtaining, by a workflow manager, a network based media processing (NBMP) workflow including a plurality of workflow tasks and a plurality of proximity parameters which indicate a plurality of desired distances between the plurality of workflow tasks and at least one of a media source and a media sink; assigning the plurality of workflow tasks to the media sink, the media source, and at least one cloud element or network element, based on the plurality of desired distances; and managing the NBMP workflow according to the assigned plurality of workflow tasks.

18 Claims, 5 Drawing Sheets

400

(56) References Cited

U.S. PATENT DOCUMENTS

2021/0004273 A1* 1/2021 You ...................... G06F 9/5038

OTHER PUBLICATIONS

"Potential improvements of ISO/IEC 23090-8 Network-based Media Processing", ISO/IEC JTC 1/SC 29/WG 11 N19062, Jan. 2020, pp. 1-129.

International Search Report dated Jun. 30, 2021 in International Application No. PCT/US2021/025574.

Written Opinion of the International Searching Authority dated Jun. 30, 2021 in International Application No. PCT/US2021/025574.

You et al., "OMAF4CLOUD: Standards-Enabled 360° Video Creation as a Service", 2019, https://www.ibc.org/download?ac=10503 (13 pages total).

* cited by examiner

TASK PROXIMITY FOR CLOUD SERVICES

CROSS-REFERENCE TO RELATED APPLICATIONS

This application is a continuation of U.S. patent application Ser. No. 17/213,948 filed on Mar. 26, 2021, which claims priority from U.S. Provisional Application No. 63/006,194, filed on Apr. 7, 2020; U.S. Provisional Application No. 63/042,477, filed on Jun. 22, 2020; U.S. Provisional Application No. 63/087,735, filed on Oct. 5, 2020; and U.S. Provisional Application No. 63/042,485, filed on Jun. 22, 2020, in the United States Patent & Trademark Office, the disclosures of which are incorporated herein by reference in their entireties.

FIELD

Embodiments of the present disclosure are directed to Moving Picture Experts Group (MPEG) Network Based Media Processing (NBMP) and, more particularly, to task proximity in media workflows.

BACKGROUND

MPEG Network Based Media Processing (NBMP) project has developed a concept of processing media on cloud. However, current NBMP design does not provide any information about how a workflow including various tasks may be allocated to the different cloud and network resources considering the proximity of those tasks to various sources and sinks. Further, to the extent that the current NBMP design provides a proximity parameter for running various tasks, there is not provided a logical grouping of the tasks, or any method for measuring the quality of dividing a workflow among different network entities, media processing entities (MPEs), sources, or sinks.

The NBMP Draft International Specification shows a great potential to increase media processing efficiency, faster and lower-cost deployment of media services, and ability to provide large scale deployment by leveraging the public, private or hybrid cloud services.

The current NBMP specification defines a placement of the tasks to the geographical location of the data center. However, there is no relative distance signaling of tasks when multiple sources and sinks exist, and there does not exist a logical grouping of the task to be run on the same hardware or cloud node or a network cluster, or a way to measure the efficiency of assigning tasks to different network entities.

SUMMARY

According to one or more embodiments, a method performed by at least one processor is provided. The method includes: obtaining, by a workflow manager, a network based media processing (NBMP) workflow including a plurality of workflow tasks and a plurality of proximity parameters which indicate a plurality of desired distances between the plurality of workflow tasks and at least one of a media source and a media sink; assigning the plurality of workflow tasks to the media sink, the media source, and at least one cloud element or network element, based on the plurality of desired distances; and managing the NBMP workflow according to the assigned plurality of workflow tasks.

According to one or more embodiments, a workflow manager of a media system is provided. The workflow manager includes: at least one processor; and memory including computer code. The computer code includes: obtaining code configured to cause the at least one processor to obtain a network based media processing (NBMP) workflow including a plurality of workflow tasks and a plurality of proximity parameters which indicate a plurality of desired distances between the plurality of workflow tasks and at least one of a media source and a media sink; assigning code configured to cause the at least one processor to assign the plurality of workflow tasks to the media sink, the media source, and at least one cloud element or network element, based on the plurality of desired distances; and managing code configured to cause the at least one processor to manage the NBMP workflow according to the assigned plurality of workflow tasks.

According to one or more embodiments, a non-transitory computer-readable medium storing computer code is provided. The computer code is configured to, when executed by at least one processor that implements a workflow manager of a media system, cause the at least one processor to: obtain a network based media processing (NBMP) workflow including a plurality of workflow tasks and a plurality of proximity parameters which indicate a plurality of desired distances between the plurality of workflow tasks and at least one of a media source and a media sink; assign the plurality of workflow tasks to the media sink, the media source, and at least one cloud element or network element, based on the plurality of desired distances; and manage the NBMP workflow according to the assigned plurality of workflow tasks.

BRIEF DESCRIPTION OF THE DRAWINGS

Further features, the nature, and various advantages of the disclosed subject matter will be more apparent from the following detailed description and the accompanying drawings in which.

DETAILED DESCRIPTION

Figure 1:
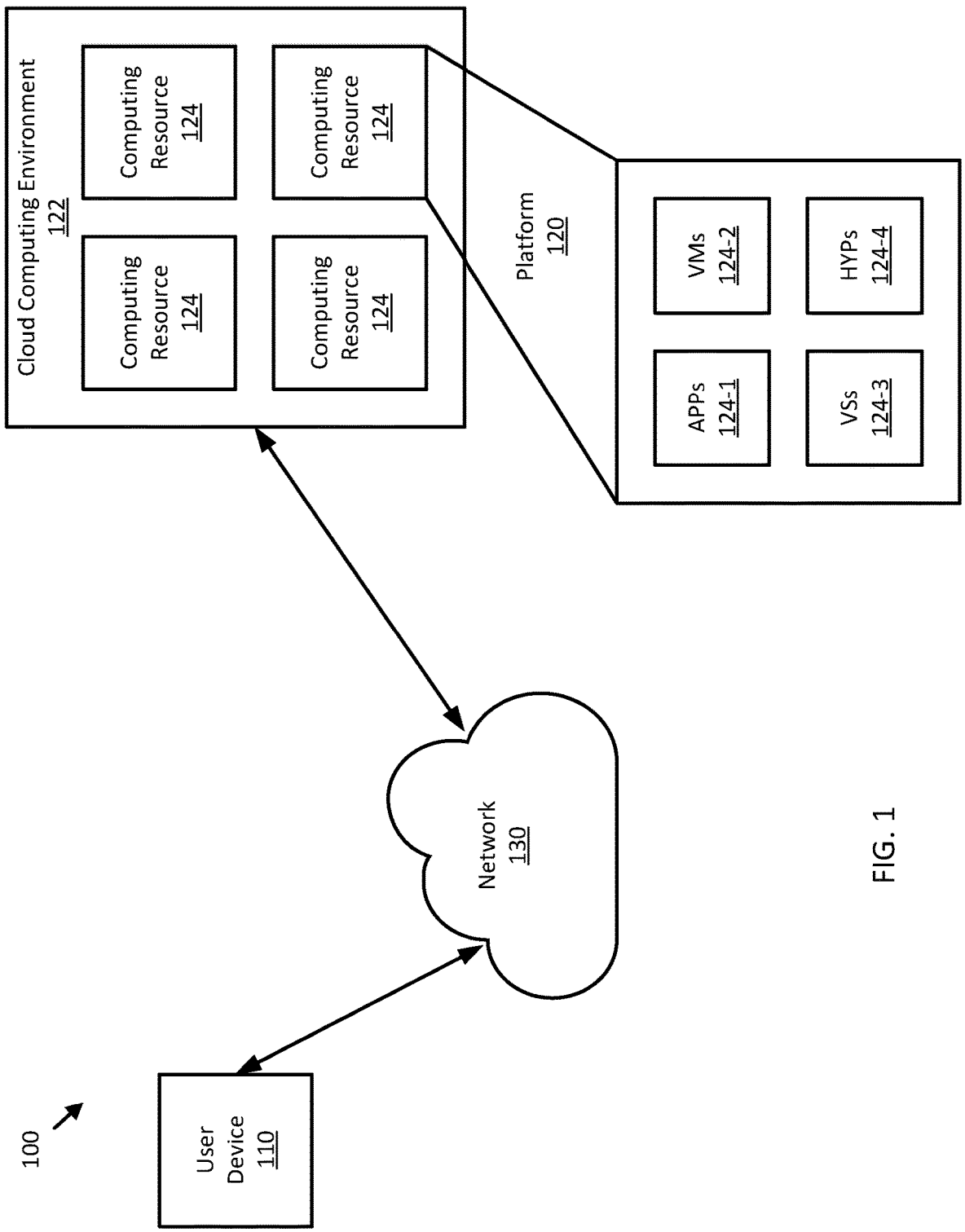
FIG. 1 is a diagram of an environment in which methods, apparatuses, and systems described herein may be implemented, according to embodiments.

FIG. 1 is a diagram of an environment 100 in which methods, apparatuses, and systems described herein may be implemented, according to embodiments. As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g. a desktop computer, a laptop computer, a tablet computer, a handheld computer, a smart speaker, a server, etc.), a mobile phone (e.g. a smart phone, a radiotelephone, etc.), a wearable device (e.g. a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out depending on a particular need. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g. the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g. a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS").

A process virtual machine may execute a single program, and may support a single process. In some implementations, the virtual machine 124-2 may execute on behalf of a user (e.g. the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g. "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 includes one or more wired and/or wireless networks. For example, the network 130 may include a cellular network (e.g. a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g. the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g. one or more devices) of the environment 100 may perform one or more functions described as being performed by another set of devices of the environment 100.

Figure 2:
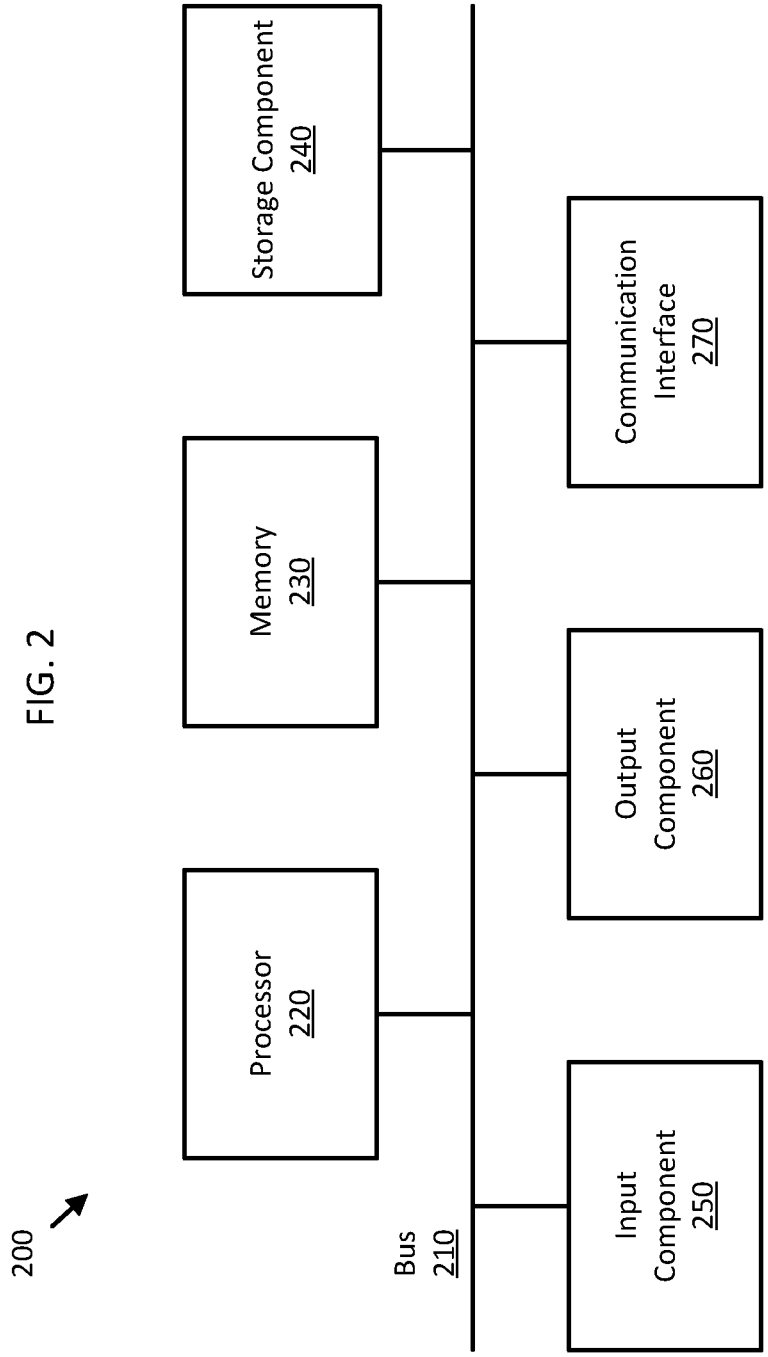
FIG. 2 is a block diagram of example components of one or more devices of FIG. 1.

FIG. 2 is a block diagram of example components of one or more devices of FIG. 1. The device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g. a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g. a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g. a touch screen display, a keyboard, a keypad, a mouse, a button, a switch, and/or a microphone). Additionally, or alternatively, the input component 250 may include a sensor for sensing information (e.g. a global positioning system (GPS) component, an accelerometer, a gyroscope, and/or an actuator). The output component 260 includes a component that provides output information from the device 200 (e.g. a display, a speaker, and/or one or more light-emitting diodes (LEDs)).

The communication interface 270 includes a transceiver-like component (e.g. a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g. one or more components) of the device 200 may perform one or more functions described as being performed by another set of components of the device 200.

Figure 3:
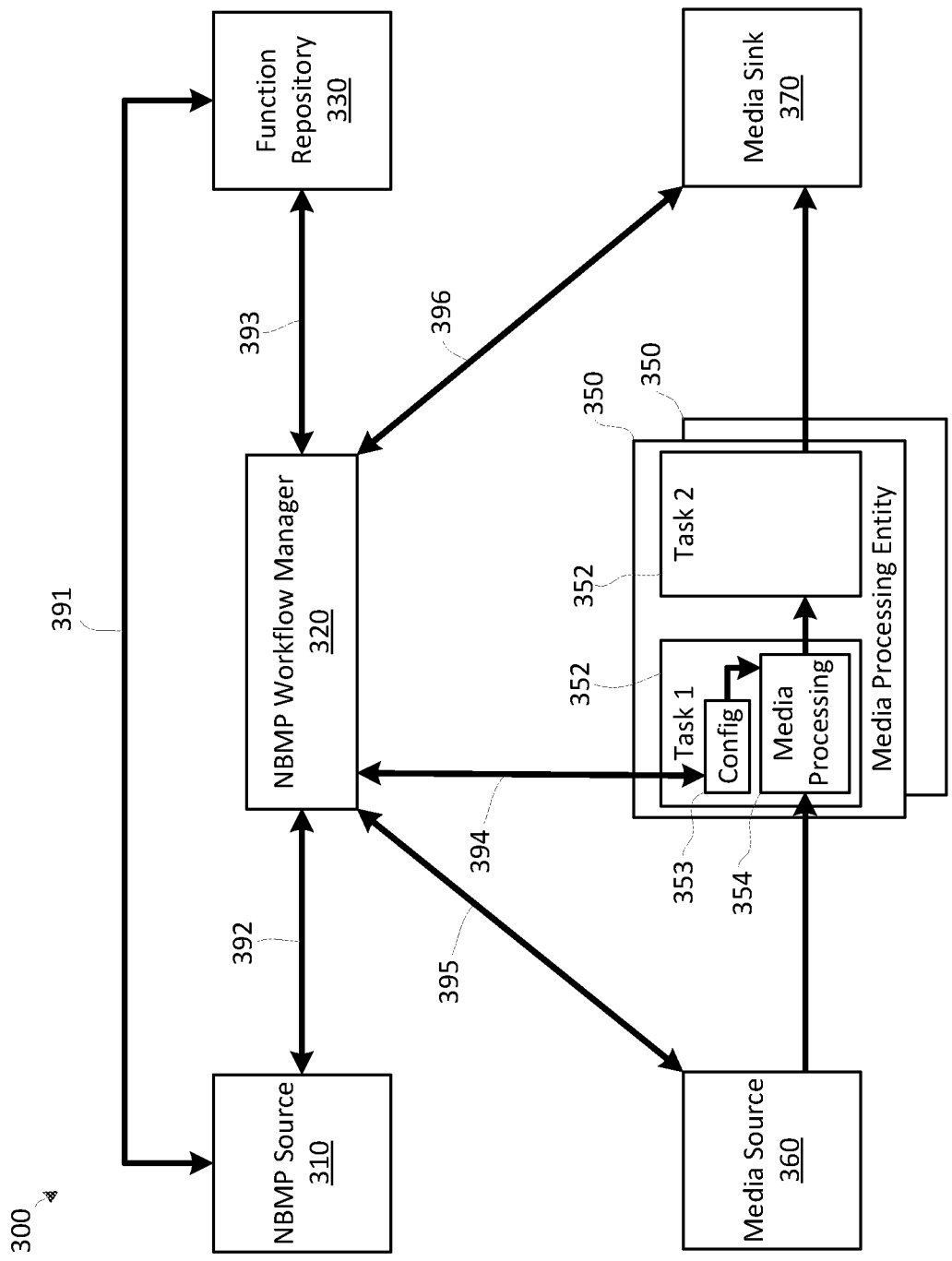
FIG. 3 is a block diagram of an NBMP system according to embodiments.

In an embodiment of the present disclosure, an NBMP system 300 is provided. With reference to FIG. 3, the NBMP system 300 includes an NBMP source 310, an NBMP workflow manager 320, a function repository 330, one or more media processing entities (MPEs) 350, a media source 360, and a media sink 370.

The NBMP source 310 may receive instructions from a third party entity, may communicate with the NBMP workflow manager 320 via an NBMP workflow API 392, and may communicate with the function repository 330 via a function discovery API 391. For example, the NBMP source 310 may send a workflow description document(s) (WDD) to the NBMP workflow manager 320, and may read the function description of functions stored in the function repository 330, the functions being media processing functions stored in memory of the function repository 330 such as, for example, functions of media decoding, feature point extraction, camera parameter extraction, projection method, seam information extraction, blending, post-processing, and encoding. The NBMP source 310 may include or be implemented by at least one processor and memory that stores code configured to cause the at least processor to perform the functions of the NBMP source 310.

The NBMP source 310 may request the NBMP workflow manager 320 to create workflow including tasks 352 to be performed by the one or more media processing entities 350 by sending the workflow description document, which may include several descriptors, each of which may have several parameters.

For example, the NBMP source 310 may select functions stored in the function repository 330 and send the workflow description document to the NBMP workflow manager 320 that includes a variety of descriptors for description details such as input and output data, required functions, and requirements for the workflow. The workflow description document may include a set of task descriptions and a connection map of inputs and outputs of tasks 352 to be performed by one or more of the media processing entities 350. When the NBMP workflow manager 320 receives such information from the NBMP source 310, the NBMP workflow manager 320 may create the workflow by instantiating the tasks based on function names and connecting the tasks in accordance with the connection map.

Alternatively or additionally, the NBMP source 310 may request the NBMP workflow manager 320 to create workflow by using a set of keywords. For example, NBMP source 310 may send the NBMP workflow manager 320 the workflow description document that may include a set of keywords that the NBMP workflow manager 320 may use to find appropriate functions stored in the function repository 330. When the NBMP workflow manager 320 receives such information from the NBMP source 310, the NBMP workflow manager 320 may create the workflow by searching for appropriate functions using the keywords that may be specified in a Processing Descriptor of the workflow description document, and use the other descriptors in the workflow description document to provision tasks and connect them to create the workflow.

The NBMP workflow manager 320 may communicate with the function repository 330 via a function discovery API 393, which may be a same or different API from the function discovery API 391, and may communicate with one or more of the media processing entities 350 via an API 394 (e.g. an NBMP task API). The NBMP workflow manager 320 may include or be implemented by at least one processor and memory that stores code configured to cause the at least processor to perform the functions of the NBMP workflow manager 320.

The NBMP workflow manager 320 may use the API 394 to setup, configure, manage, and monitor one or more tasks 352 of a workflow that is performable by the one or more media processing entities 350. In an embodiment, the NBMP workflow manager 320 may use the API 394 to update and destroy the tasks 352. In order to configure, manage, and monitor tasks 352 of the workflow, the NBMP workflow manager 320 may send messages, such as requests, to one or more of the media processing entities 350, wherein each message may have several descriptors, each of which have several parameters. The tasks 352 may each include media processing functions 354 and configurations 353 for the media processing functions 354.

In an embodiment, after receiving a workflow description document from the NBMP source 310 that does not include a list of the tasks (e.g. includes a list of keywords instead of a list of tasks), the NBMP workflow manager 320 may select the tasks based on the descriptions of the tasks in the workflow description document to search the function repository 330, via the function discovery API 393, to find the appropriate functions to run as tasks 352 for a current workflow. For example, the NBMP workflow manager 320 may select the tasks based on keywords provided in the workflow description document. After the appropriate functions are identified by using the keywords or the set of task descriptions that is provided by the NBMP source 310, the NBMP workflow manager 320 may configure the selected tasks in the workflow by using the API 394. For example, the NBMP workflow manager 320 may extract configuration data from information received from the NBMP source, and configure the tasks 352 based on the configuration data.

The one or more media processing entities 350 may be configured to receive media content from the media source 360, process the media content in accordance with the workflow, that includes tasks 352, created by the NBMP workflow manager 320, and output the processed media content to the media sink 370. The one or more media processing entities 350 may each include or be implemented by at least one processor and memory that stores code configured to cause the at least processor to perform the functions of the media processing entities 350.

The media source 360 may include memory that stores media and may be integrated with or separate from the NBMP source 310. In an embodiment, the NBMP workflow manager 320 may notify the NBMP source 310 when a workflow is prepared and the media source 360 may transmit media content to the one or more of the media processing entities 350 based on the notification that the workflow is prepared.

The media sink 370 may include or be implemented by at least one processor and at least one display that is configured to display the media that is processed by the one or more media processing entities 350.

As discussed above, messages from the NBMP Source 310 (e.g. a workflow description document for requesting creation of a workflow) to the NBMP workflow manager 320, and messages (e.g. for causing the workflow to be performed) from the NBMP workflow manager 320 to the one or more media processing entities 350 may include several descriptors, each of which may have several parameters. In cases, communication between any of the components of the NBMP system 300 using an API may include several descriptors, each of which may have several parameters.

In embodiments, each workflow or task may provide a proximity parameter per source or sink, to indicate the desired/required proximity to that source, as shown for example in Table 1:

TABLE 1

Relative distance of a task or workflow from various sources/sinks

| Desired/required distance | Source 1 | Source 2 | ... | Source N | Sink 1 | Sink 2 | ... | Sink M |
|---|---|---|---|---|---|---|---|---|
| Distance | $i_1$ | $i_2$ | | $i_n$ | $o_1$ | $o_2$ | | $o_m$ |

The distance may be defined as a number showing the relative distance of a workflow or task to each source and sink, as shown in Table 2:

TABLE 2

Proximity Parameters

| Name | Definition | Unit | Type | Valid range |
|---|---|---|---|---|
| distance | Relative number (to other distances) indicating the relative desired distance of the Workflow/Task to a source or sink | N/A | number | unsigned integer |

Therefore a distance of a task having a distance of 2N from S2 has twice the distance from S1 if its distance to S1 is N. The distance of 0 means there is no distance between task and sink/source.

To signal the distance of each workflow/task, a new array of object, proximity, may be added to General Descriptor, as shown for example in Table 3:

TABLE 3

General Descriptor

| Parameter Name | Type | Cardinality |
|---|---|---|
| id | P | 1 |
| name | P | 1 |
| description | P | 1 |
| rank | P | 0-1 |
| mpeg-compatibility | P | 0-1 |
| published-time | P | 0-1 |
| priority | P | 0-1 |
| *proximity* | *Array of object* | *0-1* |
| execution-time | P | 0-1 |
| input-ports | Array of object | 1 |
| output-ports | Array of object | 1 |
| is-group | P | 0-1 |
| state | P | 1 |

In the above Table 3, and in other Tables shown herein, added elements are indicated as italicized.

This parameter may be added to the general descriptor in the form of an array of a JSON object. The JSON object may have two parameters: sink/source identifier (id) and the distance, as shown for example in Table 4:

TABLE 4

General Descriptor with added proximity array

```
{
    "title": "General Descriptor Schema",
    "type": "object",
    "required": [
        "id", "name", "description",
        "input-ports","output-ports", "state"
    ],
    "properties": {
        "id": {
            "type": "string"
        },
        "name": {
            "type": "string"
        },
        "description": {
            "type": "string"
        },
        "rank": {
            "type": "integer",
            "minimum": 0
        },
        "mpeg-compatibility": {
            "type": "string",
            "format": "uri",
            "pattenrProperties":{
                "^urn:mpeg:mpegi:nbmp:v": {"type": "string"}
            },
            "additionalProperties": false
        },
        "published-time": {
            "type": "string",
            "format": "date-time"
        },
        "priority": {
            "type": "number"
        },
        "proximity": {
            "type": "array",
            "minItems": 1,
            "uniqueItems": true,
            "item": {
                "type": "object",
                "required": [ "id", "distance"],
                "properties": {
                    "distance": {
                        "type": "integer",
                        "minimum": "0"
                    }
                }
            }
        }
    },
    "input-ports": {
        "type": "array",
        "minItems": 1,
        "uniqueItems": true,
        "items": {
            "type": "object",
            "required": ["port-name", "bind"],
            "properties": {
                "port-name": {
                    "type": "string"
                },
                "bind": {
                    "type": "object",
                    "required": ["stream id", "name"],
                    "properties": {
                        "stream-id": {
                            "type": "string"
                        },
                        "name": {
                            "type": "string"
                        },
                        "keywords": {
                            "type": "array",
                            "minItems": 1,
                            "uniqueItems": true,
                            "items": {
                                "type": "string"
```

TABLE 4-continued

General Descriptor with added proximity array

```
                            }
                        }
                    }
                }
            }
        }
    },
    "output-ports": {
        "type": "array",
        "minItems": 1,
        "uniqueItems": true,
        "items": {
            "type": "object",
            "required": ["port-name", "bind"],
            "properties": {
                "port-name": {
                    "type": "string"
                },
                "bind": {
                    "type": "object",
                    "required": ["stream id", "name"],
                    "properties": {
                        "stream-id": {
                            "type": "string"
                        },
                        "name": {
                            "type": "string"
                        },
                        "keywords": {
                            "type": "array",
                            "minItems": 1,
                            "uniqueItems": true,
                            "items": {
                                "type": "string"
                            }
                        }
                    }
                }
            }
        }
    },
    "is-group": {
        "type": "boolean",
        "default": false
    },
    "state": {
        "type": "string"
    }
}
```

An NBMP Source 310 may assign a relative distance of a workflow to each source and/or sink in the given workflow description. The, by looking at the distance array can decide whether the entire workflow or parts of workflow to be implemented in the cloud platform or network elements that are closer to the sources or sinks with smaller distance values in the workflow description. The exact allocation depends on the availability of cloud or network resources. The optimization may be performed by the workflow manager 320 and a Cloud Manager.

In embodiments in which the workflow is given by NBMP Source 310, the workflow description document (WDD) may contain the connection map. Each function instance may have a function restriction in which the general descriptor is used. The proximity object in that descriptor may be used to describe the desired distance of the function instance to the sources and sinks.

When the workflow manager 320 instantiates each task for each function instance, it uses the proximity array to allocate the best cloud/network resources based on the indicated desired distances for those tasks.

In embodiments, the workflow may be derived by the workflow manager 320, the workflow manager 320 may provide the WDD to NBMP Source 310 including the connection map and task restrictions. The NBMP Source 310 can update the WDD, by adding the proximity object to each task restrictions. Then the workflow manager 320 with the help of Cloud Manager may want to reallocate the task to various cloud/network resources that satisfy the proximity requirements described by the updated WDD. Finally, the workflow manager 320 can return the updated WDD with the actual updated relative distance of the tasks to each source/sink.

Embodiments may provide a method for describing the relative distance of a workflow or a task from a plurality of sources or sinks and sources, including assigning a number to a respective source or sink of the plurality of sources or sinks, wherein the number indicates a relative distance from the workflow or the task to the respective source or sink compared to distances from the workflow or the task to other sources or sinks among the plurality of sources or sinks.

Embodiments may provide a method of signaling, by a Network Based Media Processing (NBMP) sink, a target proximity of the workflow or the task to the plurality of sources and sinks using the assigned number.

Embodiments may provide a method of determining proximity information of allocated cloud or network resources to each task based on the number assigned to the assigned number; using, by a NBMP workflow manager 320, the proximity information of the allocated cloud or network resources to accommodate the target proximity; and providing an update to the NBMP sink.

In embodiments, the update may include how the workflow or the task is implemented according to the target proximity.

Embodiments may relate to a new logical entity referred to as a Task Group. A Task Group may be a collection of tasks or function instances that are expected to run on the same cloud node/cluster. A Task Group may be identified with a unique identifier that is unique between Task Groups and Tasks.

A Workflow Description with a collection of functions or tasks, may have a table that defines the Task Groups as shown in Table 5:

TABLE 5

| Task Grouping | |
| --- | --- |
| Task Group Ids | Task/Function Instance Id list |
| $G_0$ | $Id_{00}, Id_{01}, \ldots Id_{0m0}$ |
| $G_1$ | $Id_{10}, Id_{11}, \ldots Id_{1m1}$ |
| ... | ... |
| $G_{(k-1)}$ | $Id_{(k-1)0}, Id_{(k-1)1}, \ldots, Id_{(k-1)m(k-1)}$ |

In the above Table 5:

K is the number of Task Groups;

$m_i$ is the number of Tasks in Group $G_i$;

$G_i$ is the id of the Task Group i, and $Id_{ij}$ is the id of Task or Function instance j in Task Group i.

The current NBMP TuC defines a distance table between tasks, MPEs, Sources, and Sinks, as shown in Table 6 below:

TABLE 6

| Relative distance of a task or workflow from various sources/sinks/MPE/Task | | | | | | | | | | | |
| --- | --- | --- | --- | --- | --- | --- | --- | --- | --- | --- | --- |
| Desired/required distance | Source 1 | ... | Source N | Sink 1 | ... | Sink M | MP E 1 | MP E 2 | ... | MP E P | Task 0 | ... | Task 1 |
| Distance | $i_1$ | | $i_n$ | $o_1$ | | $o_m$ | $n_1$ | $n_2$ | | np | $k_0$ | ... | $k_1$ |

Embodiments may relate to an extension of Table 6 to include also the Task Groups (TG) as shown in Table 7 below:

TABLE 7

| Adding Task Groups to the task distance table | | | | | | | | | | | |
| --- | --- | --- | --- | --- | --- | --- | --- | --- | --- | --- | --- |
| Desired/required distance | Source 1 | ... | Source N | Sink 1 | ... | Sink M | MP E 1 | MP E 2 | ... | MP E P | Task/ TG 0 | ... | Task/ TG 1 |
| Distance | $i_1$ | | $i_n$ | $o_1$ | | $o_m$ | $n_1$ | $n_2$ | | $n_p$ | $k_0$ | ... | $k_1$ |

Note that a distance table may be defined for each Task, or extended for Task Groups. Also, each Task Group's distance table may include columns for one or more Task Groups.

In embodiments, if a Task Group is included in the above table, each member of the Task Group that is not explicitly included in the table inherits the distance of the Task Group.

In embodiments, if a Task Group has the above table, each member of the Task Group inherits the entries of the TaskGroup Table, unless it has an explicit column for a Task or Task Group In embodiments, in a Task's distance table, if there is a distance for the Task Group that the Task belongs to, then that distance indicates the distance of that Task to all other Tasks in the Task Group.

In embodiments, in a Task's distance table, if there is a distance for any Task belonging to the same Task Group of the Task, then this value supersedes the distance of the Task Group in the same table.

The task grouping may be implemented in JSON as shown in Table 8 below:

TABLE 8

General Descriptor with added proximity array

```
{
    "title": "General Descriptor Schema",
    "type": "object",
    "required": [
        "id", "name", "description",
        "input-ports","output-ports", "state"
    ],
    "properties": {
        "id": {
            "type": "string"
        },
        "name": {
            "type": "string"
        },
        "description": {
            "type": "string"
        },
        "rank": {
            "type": "integer",
            "minimum": 0
        },
        "mpeg-compatibility": {
            "type": "string",
            "format": "uri",
            "pattenrProperties":{
                "^urn:mpeg:mpegi:nbmp:v": {"type" : "string"}
            },
            "additionalProperties": false
        },
        "published-time": {
            "type": "string",
            "format": "date-time"
        },
        "priority": {
            "type": "number"
        },
        "taskgroups": {
            "type": "array",
            "minItems": 1,
            "uniqueItems": true,
            "item": {
                "type": "object",
                "required": ["id", "tasks"],
                "properties": {
                    "id": {"type ": "string"},
                    "tasks": {
                        "type": "array",
                        "minItems": 1,
                        "uniqueItems": true,
                        "item": {"type ": "string"}
                    }
                }
            }
        },
        "proximity": {
            "type": "array",
            "minItems": 1,
            "uniqueItems": true,
            "item": {
                "type": "object",
                "required": [ "id", "distance"],
                "properties": {
                    "distance": {
                        "type": "integer",
                        "minimum":"0"
                    }
                }
            }
        },
        "input-ports": {
```

TABLE 8-continued

General Descriptor with added proximity array

```
            "type": "array",
            "minItems": 1,
            "uniqueItems": true,
            "items": {
                "type": "object",
                "required": ["port-name", "bind"],
                "properties": {
                    "port-name": {
                        "type": "string"
                    },
                    "bind": {
                        "type": "object",
                        "required": ["stream_id", "name"],
                        "properties": {
                            "stream-id": {
                                "type": "string"
                            },
                            "name": {
                                "type": "string"
                            },
                            "keywords": {
                                "type": "array",
                                "minItems": 1,
                                "uniqueItems": true,
                                "items": {
                                    "type": "string"
                                }
                            }
                        }
                    }
                }
            }
        },
        "output-ports": {
            "type": "array",
            "minItems": 1,
            "uniqueItems": true,
            "items": {
                "type": "object",
                "required": ["port-name", "bind"],
                "properties": {
                    "port-name": {
                        "type": "string"
                    },
                    "bind": {
                        "type": "object",
                        "required": ["stream_id", "name"],
                        "properties": {
                            "stream-id": {
                                "type": "string"
                            },
                            "name": {
                                "type": "string"
                            },
                            "keywords": {
                                "type": "array",
                                "minItems": 1,
                                "uniqueItems": true,
                                "items": {
                                    "type": "string"
                                }
                            }
                        }
                    }
                }
            }
        },
        "is-group": {
            "type": "boolean",
            "default": false
        },
        "state": {
            "type": "string"
        }
    }
}
```

Embodiments may provide a method for describing groups of Task or Function instances which enables defining logical group of Task or Function instances to be implemented together wherein the distance of a group of Task or function instances are described from a source, a sink, an MPE, other tasks, or others task groups, wherein the distance of task groups are defined together as well as the distance of each task or function instance inside a task group is defined from the other tasks/function instances of the same group and therefore a detailed description of the distances as well as a logical grouping of the functions are shown.

In embodiments, each workflow or task may provide a distance from source or sink or MPE, or any other network element, to indicate the desired/required proximity to that source, as shown in Table 9:

TABLE 9

Relative distance of a task or workflow from various sources/sinks

| Desired/<br>required<br>distance | Source 1 | Source 2 | ... | Sink 1 | S ... | MPE1 | ... | MPE M |
|---|---|---|---|---|---|---|---|---|
| Distance | $d_1$ | $d_2$ | d ... | d ... | d ... | | | $d_{n-1}$ |

The distance may be defined as a number showing the relative distance of a workflow or task to each source and sink, as shown in Table 10:

TABLE 10

Distance definition

| Name | Definition | Unit | Type | Valid range |
|---|---|---|---|---|
| distance | Relative number (to other distances) indicating the relative desired distance of the Workflow/Task to a source or sink | N/A | number | unsigned integer |

Therefore a distance of a task having a distance of 2N from S2 has twice the distance from S1 if its distance to S1 is N. The distance of 0 means there is no distance between task and sink/source.

To signal that a task cannot be run on a network entity or source or sink, embodiments may define an infinite distance:

If a resource (source/sink/MPE) is incapable of running a task, a largest unsigned integer (INF) can be assigned for the task's distance to that resource. Therefore, when the workflow manager 320 wants to split the tasks among different resources, it shall not assign a task to a resource that has INF value.

Difference schemes can be used to split a workflow between multiple sources, sinks, MPEs, and other network entities. The best split-rendering scheme is the one that reduces the average distance of all tasks of a workflow.

For instance, the average p-norm distance may be defined as shown in Equation 1, below:

$$pd = \left(\sum_{i=0}^{n-1} d_i^p\right)^{\frac{1}{p}} \quad \text{(Equation 1)}$$

Where d_i is the distance of task i to the sink/source/MPE that is allocated to, for n tasks in the workflow.

If the tasks proximity parameters are given by the NBMP Source 310, the NBMP Source 310 may also provide the distance function so that the workflow manager 320 can optimize the workflow split based on that function.

To signal this metric, embodiments may add an object in the General Descriptor, as shown in Tables 11-12 below:

TABLE 11

General Descriptor

| Parameter Name | Type | Cardinality |
|---|---|---|
| id | P | 1 |
| name | P | 1 |
| description | P | 1 |
| rank | P | 0-1 |
| mpeg-compatibility | P | 0-1 |
| published-time | P | 0-1 |
| priority | P | 0-1 |
| proximity | Array of object | 0-1 |
| proximity-metric | object | 0-1 |
| execution-time | P | 0-1 |
| input-ports | Array of object | 1 |
| output-ports | Array of object | 1 |
| is-group | P | 0-1 |
| state | P | 1 |

TABLE 12 proximity-metric object parameters

| Name | Definition | Unit | Type | Valid range |
|---|---|---|---|---|
| identifier | Identifier of the metric. It can have one of the following values:<br>'pnorm': p-norm distance<br>'custom': custom distance formula | N/A | string | enumerated |
| equation | Distance equation. For 'pnorm' distance, only one positive integer number as the value of p shall be included.<br>For 'custom' equation, the equation shall be described according to ISO/IEC 9899. | N/A | string | N/A |
| efficiency | The calculated average distance of a task assignment using the equation. | N/A | number | Non-negative |

The above parameters may be optional, but at least one of them may exist in the proximity-metric object. The default equation may be 2-norm in the above object.

Embodiments may provide a method for describing the infinite distance between a task and a device or network entity, wherein the infinite distance means that the task cannot be run on that device or network entity.

Embodiments may provide a method for describing the split efficiency by introducing the average distance of all tasks of the workflow to the entity they are assigned to be run, wherein the smaller average distance indicate a more efficient splitting of the workflow, wherein in a particular case, a p-norm distance is used for the calculating split efficiency.

Embodiments may provide a method of signaling the equation used for calculating the split efficiency in workflow description, wherein the information can be exchanged between an NBMP Source 310 and workflow manager 320/Cloud Platform, and any equation can be implemented, in particular, the p-norm distance.

Figure 4:
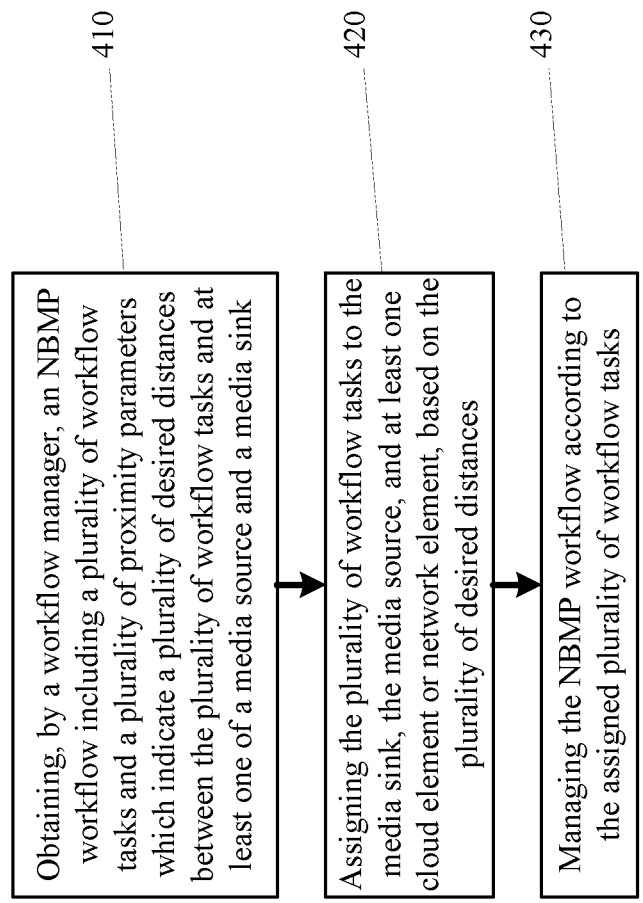
FIG. 4 is a block diagram of an example of a workflow management process according to embodiments.

[1] FIG. 4 is a flowchart illustrating example process 400 for managing an NBMP workflow. In some implementations, one or more process blocks of FIG. 4 may be performed by, for example, workflow manager 320.

[2] As shown in FIG. 4, process 400 may include obtaining, by a workflow manager, a network based media processing (NBMP) workflow including a plurality of workflow tasks and a plurality of proximity parameters which indicate a plurality of desired distances between the plurality of workflow tasks and at least one of a media source and a media sink (block 410).

[3] As further shown in FIG. 4, process 400 may include assigning the plurality of workflow tasks to the media sink, the media source, and at least one cloud element or network element, based on the plurality of desired distances (block 420).

[4] As further shown in FIG. 4, process 400 may include managing the NBMP workflow according to the assigned plurality of workflow tasks (block 430).

[5] In embodiments, the NBMP workflow may be provided by at least one from among the workflow manager or an NBMP source.

[6] In embodiments, a proximity parameter from among the plurality of proximity parameters may include a number indicating a desired distance between a workflow task of the plurality of workflow tasks and the at least one of the media source and the media sink.

[7] In embodiments, based on the desired distance being 0, the workflow task may be intended to be executed by the at least one of the media source or the media sink.

[8] In embodiments, based on the desired distance being infinite, the workflow task may be unable to be executed by the at least one of the media source or the media sink.

[9] In embodiments, the NBMP workflow may correspond to a workflow description document, and the plurality of proximity parameters may be included in at least one general descriptor included in the workflow description document.

[10] In embodiments, the NBMP workflow may include a task group which includes at least one of the plurality of workflow tasks.

[11] In embodiments, a proximity parameter of the plurality of proximity parameters may indicate a desired distance between the task group and the at least one of the media source and the media sink.

[12] In embodiments, the at least one of the plurality of workflow tasks included in the task group may inherit the desired distance.

[13] In embodiments, an average of the plurality of desired distances may be used to determine an efficiency of the NBMP workflow.

Figure 5:
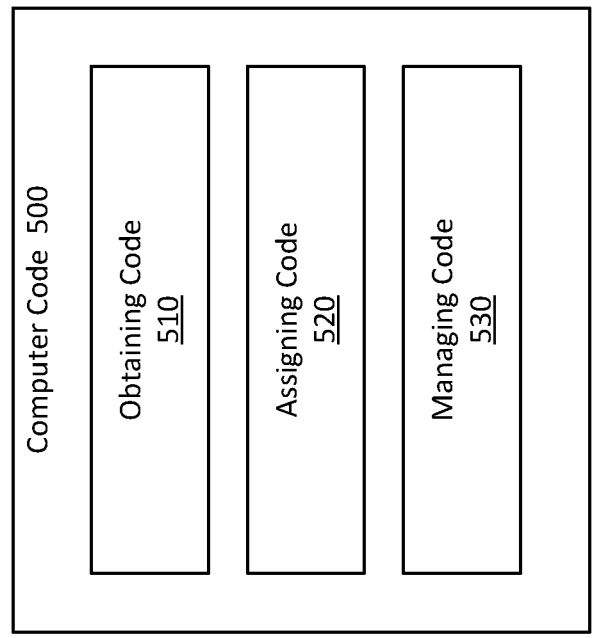
FIG. 5 is a block diagram of computer code according to embodiments.

In embodiments, with reference to FIG. 5, computer code 500 may be implemented in the NBMP system 300. For example, the computer code may be stored in memory of the NBMP workflow manager 320 and may be executed by at least one processor of the NBMP workflow manager 320. The computer code may include, for example, obtaining code 510, assigning code 520, and managing code 530.

The workflow obtaining code 510, assigning code 520, and managing code 530 may be configured to cause the at least one processer of the NBMP workflow manager 320 to perform the aspects of the process described above with reference to FIG. 4, respectively.

The obtaining code 510 may be configured to cause the at least one processor to obtain a network based media processing (NBMP) workflow including a plurality of workflow tasks and a plurality of proximity parameters which indicate a plurality of desired distances between the plurality of workflow tasks and at least one of a media source and a media sink.

The assigning code 520 may be configured to cause the at least one processor to assign the plurality of workflow tasks to the media sink, the media source, and at least one cloud element or network element, based on the plurality of desired distances.

The managing code 530 may be configured to cause the at least one processor to manage the NBMP workflow according to the assigned plurality of workflow tasks.

Embodiments of the present disclosure may be used separately or combined in any order. Further, each of the embodiments (and methods thereof) may be implemented by processing circuitry (e.g., one or more processors or one or more integrated circuits). In one example, the one or more processors execute a program that is stored in a non-transitory computer-readable medium.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method performed by at least one processor, the method comprising:
   obtaining, by a workflow manager, a network based media processing (NBMP) workflow including a plurality of workflow tasks and a plurality of proximity parameters which indicate a plurality of desired distances between the plurality of workflow tasks and at least one of a media source and a media sink;
   assigning the plurality of workflow tasks to the media sink, the media source, and at least one cloud element or network element, based on the plurality of desired distances; and
   managing the NBMP workflow according to the assigned plurality of workflow tasks,
   wherein a proximity parameter of the plurality of proximity parameters comprises a number included in a descriptor corresponding to a workflow task of the plurality of workflow tasks, and wherein the number directly indicates a desired distance between the workflow task and the at least one of the media source and the media sink.

2. The method of claim 1, wherein the NBMP workflow is provided by at least one from among the workflow manager or an NBMP source.

3. The method of claim 1, wherein based on the desired distance being 0, the workflow task is intended to be executed by the at least one of the media source or the media sink.

4. The method of claim 1, wherein based on the desired distance being infinite, the workflow task is unable to be executed by the at least one of the media source or the media sink.

5. The method of claim 1, wherein the NBMP workflow corresponds to a workflow description document, and
wherein the plurality of proximity parameters are included in at least one general descriptor included in the workflow description document.

6. The method of claim 1, wherein the NBMP workflow includes a task group which includes at least one of the plurality of workflow tasks.

7. The method of claim 6, wherein the proximity parameter indicates a desired distance between the task group and the at least one of the media source and the media sink.

8. The method of claim 7, wherein the at least one of the plurality of workflow tasks included in the task group inherits the desired distance.

9. The method of claim 1, wherein an average of the plurality of desired distances is used to determine an efficiency of the NBMP workflow.

10. A workflow manager of a media system, the workflow manager comprising:
at least one processor; and
memory comprising computer code, the computer code comprising:
obtaining code configured to cause the at least one processor to obtain a network based media processing (NBMP) workflow including a plurality of workflow tasks and a plurality of proximity parameters which indicate a plurality of desired distances between the plurality of workflow tasks and at least one of a media source and a media sink;
assigning code configured to cause the at least one processor to assign the plurality of workflow tasks to the media sink, the media source, and at least one cloud element or network element, based on the plurality of desired distances; and
managing code configured to cause the at least one processor to manage the NBMP workflow according to the assigned plurality of workflow tasks,
wherein a proximity parameter of the plurality of proximity parameters comprises a number included in a descriptor corresponding to a workflow task of the plurality of workflow tasks, and
wherein the number directly indicates a desired distance between the workflow task and the at least one of the media source and the media sink.

11. The workflow manager of claim 10, wherein the NBMP workflow is provided by at least one from among the workflow manager or an NBMP source.

12. The workflow manager of claim 10, wherein based on the desired distance being 0, the workflow task is intended to be executed by the at least one of the media source or the media sink.

13. The workflow manager of claim 10, wherein based on the desired distance being infinite, the workflow task is unable to be executed by the at least one of the media source or the media sink.

14. The workflow manager of claim 10, wherein the NBMP workflow corresponds to a workflow description document, and
wherein the plurality of proximity parameters are included in at least one general descriptor included in the workflow description document.

15. The workflow manager of claim 10, wherein the NBMP workflow includes a task group which includes at least one of the plurality of workflow tasks.

16. The workflow manager of claim 15, wherein the proximity parameter indicates a desired distance between the task group and the at least one of the media source and the media sink, and
wherein the at least one of the plurality of workflow tasks included in the task group inherits the desired distance.

17. The workflow manager of claim 10, wherein an average of the plurality of desired distances is used to determine an efficiency of the NBMP workflow.

18. A non-transitory computer-readable medium storing computer code that is configured to, when executed by at least one processor that implements a workflow manager of a media system, cause the at least one processor to:
obtain a network based media processing (NBMP) workflow including a plurality of workflow tasks and a plurality of proximity parameters which indicate a plurality of desired distances between the plurality of workflow tasks and at least one of a media source and a media sink;
assign the plurality of workflow tasks to the media sink, the media source, and at least one cloud element or network element, based on the plurality of desired distances; and
manage the NBMP workflow according to the assigned plurality of workflow tasks,
wherein a proximity parameter of the plurality of proximity parameters comprises a number included in a descriptor corresponding to a workflow task of the plurality of workflow tasks, and
wherein the number directly indicates a desired distance between the workflow task and the at least one of the media source and the media sink.

* * * * *